Aug. 10, 1965   J. M. GARRETT   3,199,387
TOOL HOLDER FOR CAM FEED AUTOMATIC MACHINES
Filed July 10, 1963

INVENTOR.
JOSEPH M. GARRETT
BY Oscar B Brumback
his Attorney 3,199,387
TOOL HOLDER FOR CAM FEED AUTO-
MATIC MACHINES
Joseph M. Garrett, Arnold, Md., assignor to Koppers
Company, Inc., a corporation of Delaware
Filed July 10, 1963, Ser. No. 294,131
1 Claim. (Cl. 82—36)

This invention relates generally to tool holders for cam feed automatic cutting machines.

In cam feed automatic cutting machines, a tool holder holds the cutting tool; and it, in turn, is held by the tool post of a compound rest. As the workpiece moves with the face plate of the headstock, the cutting tool is fed across the face of the workpiece. The disadvantage of such an arrangement heretofore has been that after the cutting is completed, it is difficult to withdraw the cutting tool from the workpiece without scoring or filleting the workpiece.

This invention contemplates a novel tool holder with a provision for automatically releasing the tool from the workpiece when the cut has been completed.

This invention contemplates a tool holder whose shank portion is adapted to be held by the conventional tool post while its head portion holds a tool, and which has provision for rotation of the head portion relative to the shank portion. A stop on the shank portion limits this relative rotation in one direction, and a biasing means between the stop and the head portion normally urges the head to rotate in the opposite direction. The application of a cutting force to the cutting tool overcomes the biasing means to keep the head firmly against the stop as long as a cutting action takes place, but upon completion of the cutting action, the biasing means automatically rotates the tool away from the workpiece.

The above and further objects and novel features of this invention will appear more fully from the following detailed description when the same is read on connection with the accompanying drawings. It is to be expressly understood, however, that the drawings are not intended as a definition of the invention but are for the purpose of illustration only.

In the drawings whose like parts are marked alike:

Figure 2:
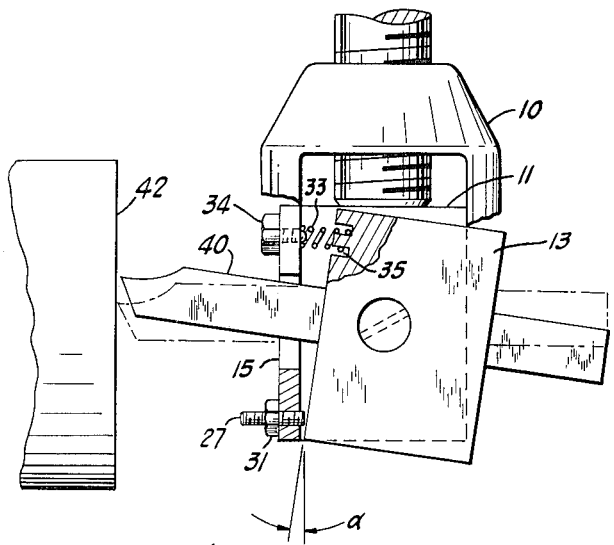
FIGURE 2 is an elevational view of the novel tool holder in a tool post as viewed in the direction II—II of FIGURE 1.
Figure 1:
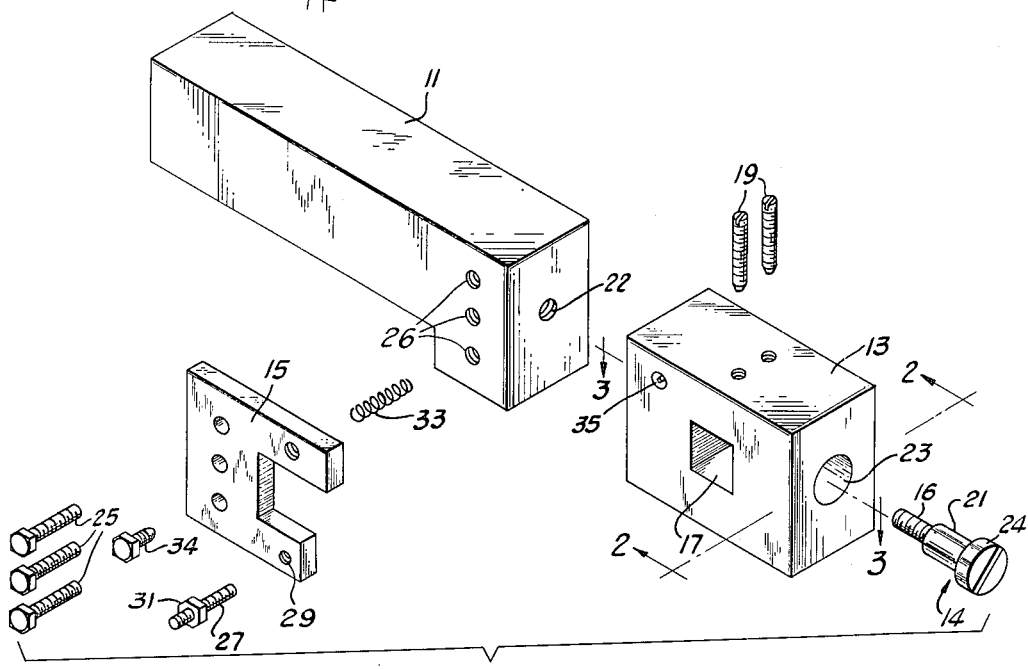
FIGURE 1 is an exploded isometric view of an embodiment of the novel tool holder.
Figure 3:
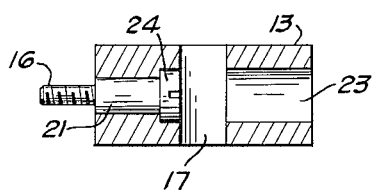
FIGURE 3 is a cross-section of FIGURE 1 taken along lines III—III.

As illustrates herein, the tool holder comprises a shank portion 11 and a head portion 13. The head portion is mounted by way of bearing 14 for movement relative to the shank portion and a stop 15 prevent this relation motion.

The shank 11 is adapted to be held in the tool post 10 of a conventional lathe. The head portion 13 has a rectangular aperture 17 in which the cutting tool 40 is placed and secured by a pair of set screws 19.

To provide for the rotation of head 13 relative to shank 11, the portion 16 of bearing 14 is fixedly threaded in shank 11, and the portion 21 fits in aperture 22. Bearing 14 passes through aperture 23 and through aperture 17. The portion 21 supports head 13 for rotation relative to shank 11. Portion 24 retains head 13 against shank 11 adjacent to aperture 22.

The stop 15 limits the relative rotation of head 13 and shank 11 in one direction. Member 15 is secured to shank 11 as by bolts 25 threaded in holes 26. As illustrated herein, member 15 is of a general "C" shape. A stud bolt 27 is threaded into aperture 29 of stop 15 and is locked by nut 31. Stud bolt 27 is used to adjust the amount of relief after the cut is completed. The biasing action for the relative rotation of head 13 and shank 11 is provided by a spring 33 betwen head 13 and stop 15. This spring 33, when completely compressed, rests in recess 35 of head 13. Head 13 rotates away from bolt 27 and rests against stop 15 while tool 40 is engaged with the workpiece. A bolt 34 positions spring 33 and rotates head 13, moving the tool into relief position for tool withdrawal.

In operation, shank 11 (FIG. 2) is held by tool post 10. Thereafter, a tool 40 is inserted in aperture 17 and securely locked therein by set screws 19. As illustrated in heavy line, the head is displaced a small angle from abutment 15. As the tool is fed against the workpiece and a cutting starts, tool 40 moves in a counterclockwise direction to the position as illustrated in dotted lines. This brings head 13 against stop 15 so that during the cutting operation, the shank portion 11 and head portion 13 are, for operating purposes, an integral unit. Biasing spring 33 at this time is compressed and held within recess 35. As soon as the cutting has been completed, the force on cutter 40 is released, and spring 33 becomes operable to turn head 13 in a clockwise direction to the position illustrated in solid line. This removes tool 40 from workpiece 42.

The foregoing has presented a novel tool holder with provision for automatically relieving the cutting tool from the workpiece as soon as the cutting has been completed thereby eliminating scoring and/or withdrawal marks. All of this involves a revolving action of the head relative to the shank of the tool holder. The two parts are integral during cutting operations.

What is claimed is:

A tool holder comprising, a body having a shank portion at one end, a head portion at the other end of said body pivotally mounted to said shank portion, said head having a first aperture extending therethrough with more than half its length being an enlarged counterbore, said head having a second aperture extending therethrough and transversely across said first aperture, a shoulder screw in said first aperture threadably engaging said shank to provide said pivotal mounting, a stop on said shank for limiting rotation of said head in one direction, a cutting tool secured in said second aperature overlying said shoulder screw so that a separating force between said tool and the workpiece does not cause rotation of said head, and spring biasing means between said stop and said head for urging said head to rotate in the opposite direction whereby said head is forced against said stop during a cutting operation but automatically is rotated away from said stop upon completion of the cutting operation.

References Cited by the Examiner

UNITED STATES PATENTS 2,525,216  10/50  Garrand _____ 82—37

FOREIGN PATENTS 826,535  1/52  Germany.

WILLIAM W. DYER, Jr., *Primary Examiner.*

UNITED STATES PATENT OFFICE
CERTIFICATE OF CORRECTION

Patent No. 3,199,387                                            August 10, 1965

Joseph M. Garrett

It is hereby certified that error appears in the above numbered patent requiring correction and that the said Letters Patent should read as corrected below.

Column 2, line 41, for "pivotally" read -- pivotably --.

Signed and sealed this 8th day of March 1966.

(SEAL)
Attest:

ERNEST W. SWIDER                                     EDWARD J. BRENNER
Attesting Officer                                          Commissioner of Patents